(12) United States Patent
Yeten et al.

(10) Patent No.: US 9,043,188 B2
(45) Date of Patent: May 26, 2015

(54) SYSTEM AND METHOD FOR FORECASTING PRODUCTION FROM A HYDROCARBON RESERVOIR

(75) Inventors: Burak Yeten, San Ramon, CA (US); Joseph Martin Hovadik, Saint Cyr (FR); Pierre Muron, Berkeley, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 1193 days.

(21) Appl. No.: 12/316,999

(22) Filed: Dec. 18, 2008

(65) Prior Publication Data

US 2010/0161300 A1  Jun. 24, 2010

Related U.S. Application Data

(63) Continuation-in-part of application No. 11/848,348, filed on Aug. 31, 2007, now Pat. No. 8,335,677.

(60) Provisional application No. 60/841,858, filed on Sep. 1, 2006.

(51) Int. Cl.
*G06F 7/48* (2006.01)
*E21B 43/00* (2006.01)
*G06F 17/50* (2006.01)

(52) U.S. Cl.
CPC ............ *E21B 43/00* (2013.01); *G06F 17/5009* (2013.01); *G06F 2217/16* (2013.01)

(58) Field of Classification Search
USPC .......................................................... 703/10
See application file for complete search history.

(56) References Cited

U.S. PATENT DOCUMENTS

| | | | |
|---|---|---|---|
| 6,101,447 A | 8/2000 | Poe, Jr. | |
| 6,549,879 B1 | 4/2003 | Cullick et al. | |
| 6,810,332 B2 | 10/2004 | Harrison | |
| 6,980,940 B1 | 12/2005 | Gurpinar et al. | |
| 7,478,024 B2 * | 1/2009 | Gurpinar et al. | 703/10 |
| 7,672,825 B2 * | 3/2010 | Brouwer et al. | 703/10 |
| 7,716,029 B2 * | 5/2010 | Couet et al. | 703/10 |
| 7,725,302 B2 * | 5/2010 | Ayan et al. | 703/10 |
| 7,739,089 B2 * | 6/2010 | Gurpinar et al. | 703/10 |
| 7,953,585 B2 * | 5/2011 | Gurpinar et al. | 703/10 |
| 8,396,826 B2 * | 3/2013 | Mijares et al. | 706/61 |
| 8,688,425 B2 * | 4/2014 | Oppert et al. | 703/10 |
| 2002/0013687 A1 * | 1/2002 | Ortoleva | 703/10 |
| 2005/0038603 A1 | 2/2005 | Thomas et al. | |
| 2006/0069511 A1 | 3/2006 | Thambynayagam et al. | |
| 2007/0016389 A1 * | 1/2007 | Ozgen | 703/10 |
| 2008/0294387 A1 * | 11/2008 | Anderson et al. | 703/1 |
| 2010/0250206 A1 * | 9/2010 | Yogeswaren | 703/2 |

* cited by examiner

*Primary Examiner* — Kamini S Shah
*Assistant Examiner* — Juan Ochoa

(57) ABSTRACT

A system and method is taught to substantially automate forecasting for a hydrocarbon producing reservoir through integration of modeling module workflows. A control management module automatically generates static and dynamic offspring models, with static and dynamic modeling software, until a performance objective associated with the forecasting of the reservoir is satisfied. The performance objective can include an experimental design table to determine a sensitivity of a particular parameter or can be directed towards reservoir optimization, i.e., ultimate hydrocarbon recovery, net present value, reservoir percentage yield, reservoir fluid flow rate, or history matching error.

19 Claims, 7 Drawing Sheets

SYSTEM AND METHOD FOR FORECASTING PRODUCTION FROM A HYDROCARBON RESERVOIR

RELATED APPLICATIONS

The present application is a continuation-in-part of and claims the benefit of patent application U.S. Ser. No. 11/848,348, filed Aug. 31, 2007 now U.S. Pat. No. 8,335,677, which claims benefit of provisional patent application U.S. Ser. No. 60/841,858, filed Sep. 1, 2006, which the entirety of each application are incorporated herein by reference.

FIELD OF THE INVENTION

The present invention is generally related to forecasting hydrocarbon production from a subterranean reservoir, and more particularly, to integrated workflows for static and dynamic reservoir modeling for forecasting hydrocarbon production from a subterranean reservoir.

BACKGROUND OF THE INVENTION

Decisions to develop new reservoir fields and how to efficiently manage production of current fields are of great significance in the petroleum industry. These decisions must be knowledgeable and often made in a timely manner. In situations where capital expenses are high and other risks abundant, carefully analyzing inherent uncertainties of the reservoir field and how they impact the forecasted production becomes a daunting task. This is especially true when coupled with stringent deadlines, or when in challenging environments such as for offshore reservoirs. If business decisions are made based on incomplete or poor characterizations of the reservoir, or if the characterizations of the reservoir are delayed, substantial financial loss can occur due to premature hydrocarbon contract negotiations, incomplete or inaccurate reservoir certifications, poorly negotiated service contracts, non-optimized recovery of the hydrocarbon reserves, or a combination thereof.

Accurately forecasting the performance of a reservoir requires realistic static and dynamic models representative of the reservoir. Static and dynamic models can be generated from a plurality of different workflows, and are generally populated with the available engineering and geological data of the reservoir. Depending on the complexity and location of the reservoir, this data can be limited as costs can become prohibitive.

Static models generally comprise a structural and stratigraphic framework populated with parameters such as sedimentological properties, permeability distributions, porosity distributions, fluid contacts, and fluid saturations. There are many commercially available products for constructing static models, such as Earth Decision Suite (powered by GOCAD™) distributed by Paradigm Geotechnology BV headquartered in Amsterdam, The Netherlands and Petrel™ from Schlumberger Limited headquartered in Houston, Tex. Static models are typically constructed by a team including geologists, geophysicists, and stratigraphers using reservoir data from a variety of sources such as core samples, well logs, and seismic surveys. Depending on the data interpretation and chosen modeling package, multiple realizations of the same geology may be made, leading to similar, yet different geological models being shaped by quasi-random variations. A certain amount of validation that the static model is an appropriate geological interpretation can be given with additional geochemical and geostatistical analysis; however, only a certain amount of deterministic information may be extracted from the subterranean formation, and one typically relies on applying probabilistic methods in combination with the obtained data to construct a reasonable static reservoir model.

Dynamic models typically comprise upscaled versions of static models populated with additional information such as reservoir fluid flow rates and reservoir pressure-volume-temperature (PVT) characteristics. The upscaling process entails coarsening the fine-scale resolution of the static model to allow for computational tractability. There are also many commercially available products for building these dynamic models, such as Chevron's proprietary CHEARS™ simulation-package or Schlumberger's ECLIPSE™ reservoir simulator. Dynamic models are normally constructed by reservoir engineers, for which a different skill profile is typically demanded in comparison to the assemblers of the static model.

Due to the multi-disciplinary roles needed to construct static and dynamic models of a subterranean reservoir, certain significant intricacies of the reservoir's geology can be occasionally surrendered as the importance of these aspects are overlooked or simply undervalued.

Once production of the reservoir begins, it is desired that the static and dynamic models be continuously updated with new production data so that they may reliably predict future extraction amounts. This is another challenge, as the real time data should be managed and filtered to best use it effectively to delineate the reservoir model description and flow parameters. Determining what production data is useful and then manually inputting this data into the model is often tedious and very time consuming. Typically, the static model needs to first be conditioned with the filtered production data, and reconstructed creating a static offspring model. The static parameters of this new offspring model are then applied to the dynamic model so that it can be simulated, thus producing an updated dynamic model. This process is iteratively repeated, typically in a linear fashion, to eventually generate an updated reservoir production forecast. One becomes limited in the number of model iterations they can run due to the time and cost constraints needed to perform a proper optimization investigation. The performance predictions may also not be "optimized" due to poor analysis of the many inherent uncertainties of the static and dynamic models. Additionally, loss of data or its significance may be overlooked during transfer of data between the reservoir production engineers, the static modeling team, and the dynamic modeling team.

The updated reservoir forecast is used to sufficiently understand the complex chemical, physical and fluid flow processes occurring in the reservoir to predict future reservoir behavior and maximize the ultimate hydrocarbon recovery. To test the reliability of the forecast, history matching techniques can be employed. These techniques attempt to find plausible flow solutions by trying to mimic past performances through simulation of the reservoir model and comparing the outcome with actual production data. Mathematically, this is done by searching for minima of an objective function below a predetermined threshold value. In certain circumstances, a good match may not be found and one must rely on the best apparent match produced. In other instances, a plurality of acceptable history matching solutions may be found leading to inconclusive predictions.

SUMMARY OF THE INVENTION

According to an aspect of the present invention, a computer implemented method is disclosed to automate forecasting of a hydrocarbon producing reservoir. The method includes providing a performance objective associated with forecasting of a hydrocarbon producing reservoir. The performance objective is provided via a user interface that is in communication with a reservoir modeling program. A static model representative of at least a portion of the hydrocarbon producing reservoir is generated with a static modeling module. A dynamic model representative of at least a portion of the hydrocarbon producing reservoir is generated with a dynamic modeling module. A control management module iteratively combines the static and dynamic models to generate at least one offspring model. The at least one offspring model is generated with at least one of the static and dynamic modeling modules. Generation of the at least one offspring model continues until the performance objective is satisfied. Once the performance objective is satisfied, a result according to the performance objective, which is associated with the forecasting of the hydrocarbon producing reservoir, is output.

Another aspect of the present invention includes a computer implemented method to automate forecasting of a hydrocarbon producing reservoir. The method includes modeling a static model representative of at least a portion of a hydrocarbon producing reservoir with a static modeling module. The method includes modeling a dynamic model representative of at least a portion of the hydrocarbon producing reservoir with a dynamic modeling module. A control management module generates a discrete set of parameters responsive to the static model and the dynamic model. An offspring model is generated with at least one of the static and dynamic modeling modules The offspring model is generated responsive to at least one parameter from the discrete set of parameters. The discrete set of parameters is updated responsive to the offspring model. The offspring model is iteratively refined until it has been generated a predetermined number of iterations, the offspring models converge to a predetermined variance, or the offspring models have been generated a sufficient number of iterations to determine a sensitivity of the parameter. A visual display of a solution associated with the forecasting of the hydrocarbon producing reservoir is output.

Another aspect of the present invention includes a system to automate forecasting of a hydrocarbon producing reservoir. The system includes a computer processor and a computer program executable on the computer processor. The computer program includes a first modeling module to provide a first model representative of at least a portion of the hydrocarbon producing reservoir. The computer program includes a second modeling module to provide a second model representative of at least a portion of the hydrocarbon producing reservoir. The computer program includes a control management module that generates offspring models responsive to at least one of the first model and the second model. The offspring models are generated with at least one of the first modeling module and the second modeling module. Generation of the offspring models continues until a performance objective associated with the forecasting of the system is satisfied. The control management module outputs a result according to the performance objective subsequent to the performance objective being satisfied.

Another aspect of the present invention includes a system to automate forecasting of a hydrocarbon producing reservoir. The system includes a computer processor and a software program executable on the computer processor. The software program includes a first modeling module to produce a first model representative of at least a portion of the hydrocarbon producing reservoir. The software program includes a second modeling module to produce a second model representative of at least a portion of the hydrocarbon producing reservoir. The software program includes a control management module capable of initiating execution of the software program responsive to a performance objective. The control management module includes a model retriever to retrieve the first and second models over a communications network. The control management module includes a model generator to generate offspring models responsive to the first and second models with the first and second modeling modules. The control management module includes a proxy generator to generate a proxy function responsive to the first and second models. The control management module includes a model filter capable of prohibiting the model generator from generating offspring models responsive to the proxy function. The control management module includes a model evaluator to evaluate the offspring models and generate a forecast for the hydrocarbon producing reservoir. The system includes a user control interface for inputting information, including a performance objective, into the system. The system includes a database to store the performance objective, first and second models, and offspring models. The system includes a user reporting means in communication with the control management software over the communications network to output the forecast for the hydrocarbon producing reservoir.

Another aspect of the present invention includes software stored on a processor readable medium to substantially automate forecasting for a hydrocarbon producing reservoir. The software includes a model retriever to retrieve a model representative of at least a portion of the hydrocarbon producing reservoir from a modeling, module. The software includes a proxy generator to generate a proxy function responsive to the model. The software includes a model generator to generate an offspring model with the modeling module that is responsive to the model. The software includes a model filter capable of prohibiting the model generator from generating the offspring model responsive to the proxy function. The software includes a model evaluator to evaluate the offspring model and generate a forecast for the hydrocarbon producing reservoir.

DETAILED DESCRIPTION OF THE INVENTION

Embodiments of the present invention described herein provide for efficient systems and methods that integrate workflows of computational modeling. Such systems and methods are generally applied to forecasting of hydrocarbon production from a subterranean reservoir.

Figure 1:
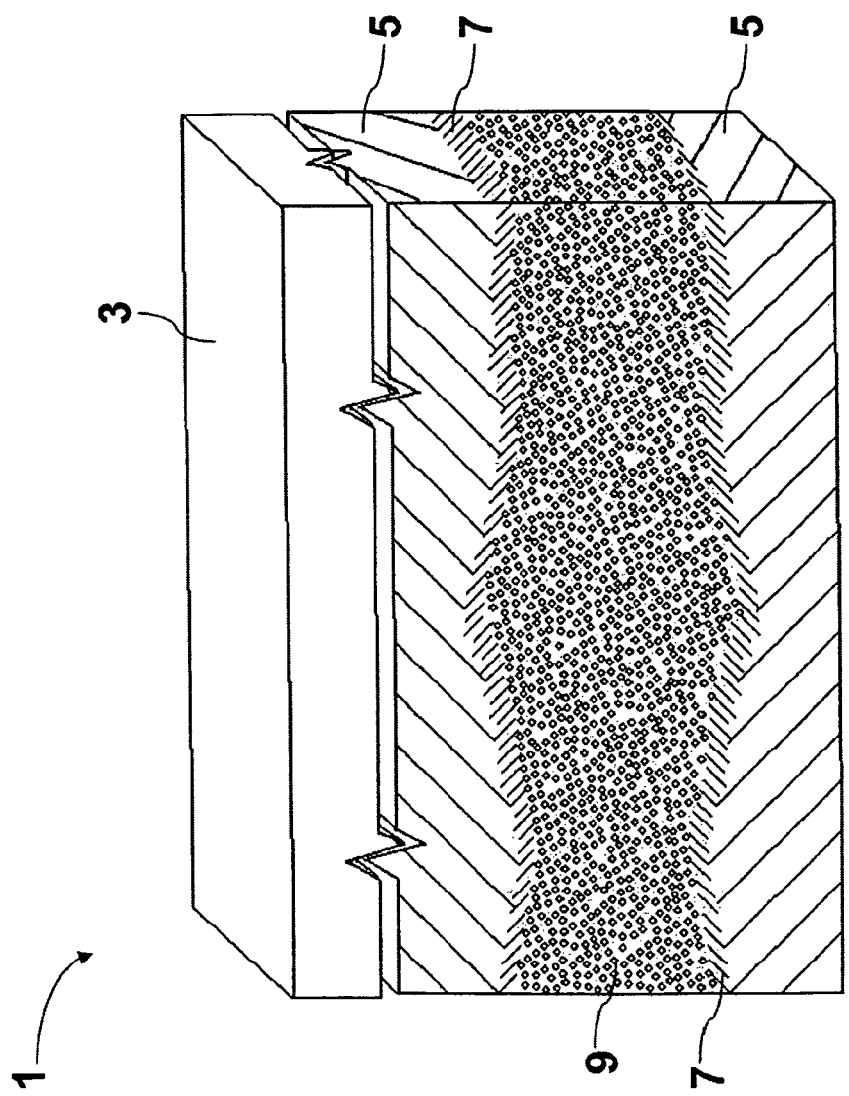
FIG. 1 is a schematic view illustrating a physical geologic volume of a subterranean reservoir containing hydrocarbons, in accordance with the present invention.

FIG. 1 depicts a physical geologic volume of a subterranean reservoir 1. Subterranean reservoir 1 is comprised of an upper surface 3, which can extend to the earth's physical surface, and a plurality of strata 5 located beneath upper surface 3. The plurality of strata 5 are typically composed of parallel layers of rock and fluid material each characterized by different sedimentological and fluid properties. Hydrocarbons 9 may accumulate below or between non-porous or lower permeability rock formations 7. If a large enough pool of hydrocarbons 9 is discovered, extraction of hydrocarbons 9 from subterranean reservoir 1 is typically desired. Practice of the present invention is generally applicable to the forecasting of hydrocarbon production from reservoirs, such as subterranean reservoir 1.

Figure 2:
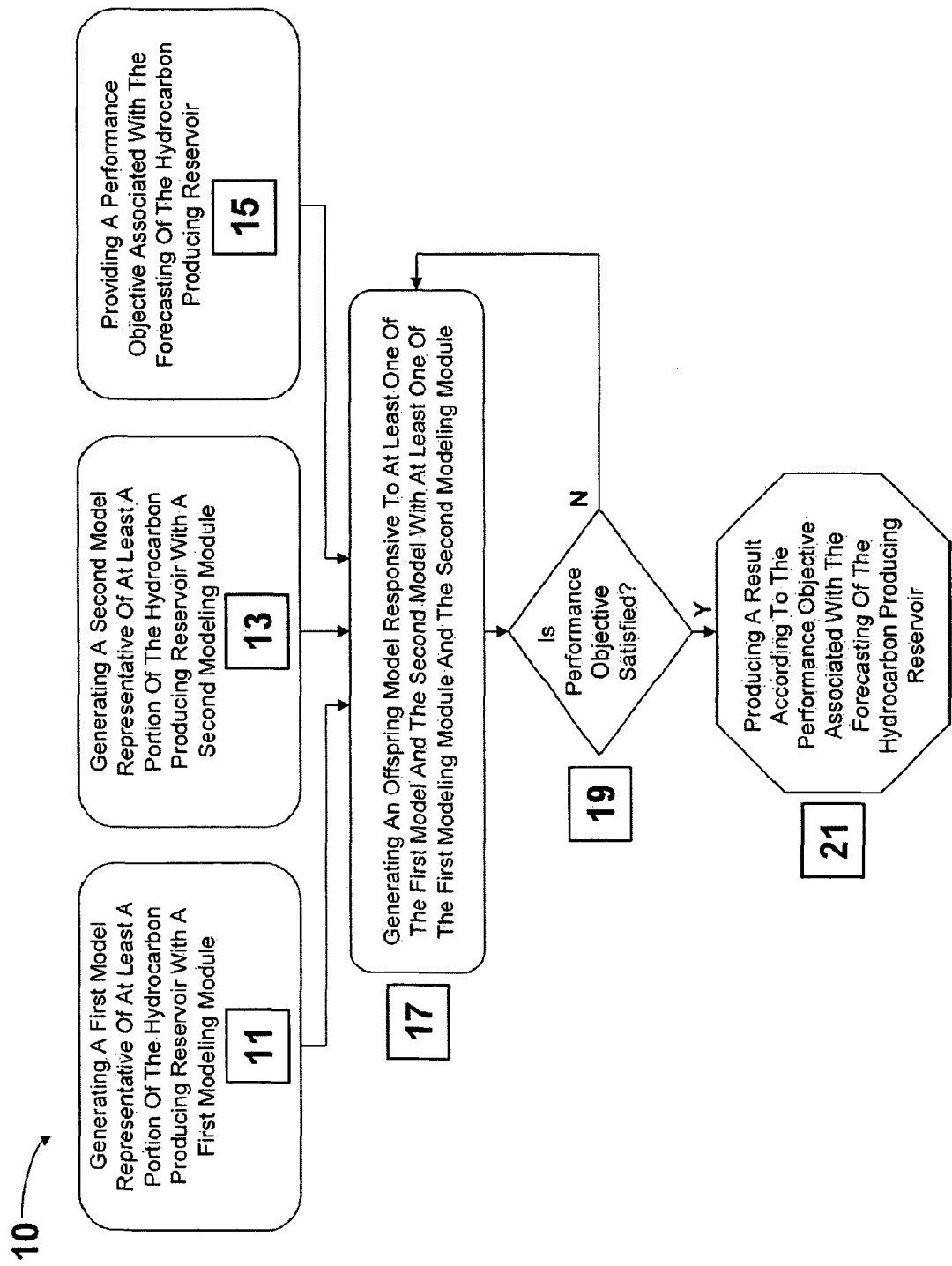
FIG. 2 is a flowchart illustrating steps of an integrated modeling workflow, in accordance with the present invention.

FIG. 2 is a flowchart illustrating steps of an integrated modeling workflow to method 10 to substantially automate forecasting for a hydrocarbon producing reservoir. In step 11, method 10 includes modeling a first model representing at least a portion of a hydrocarbon producing reservoir, such as subterranean reservoir 1. As will be described more fully herein, a first modeling module is capable of generating the first model. In step 13, method 10 includes modeling a second model representing at least a portion of a hydrocarbon producing reservoir, such as subterranean reservoir 1. As will be described more fully herein, a second modeling module is capable of generating the second model. In step 15, a performance objective is provided. The performance objective drives the desired forecasting outcome and typically is either an optimization study or uncertainty assessment. In some embodiments, the performance objective is manually selected by an operator via a user interface. As shown in step 17, an offspring model is generated with either of the first or second modeling modules. The offspring model is generated once the performance objective has been determined in step 15 and the first and second models have been constructed in steps 11 and 13 respectively. The offspring model is a progeny of the first and second model, as it is generated from a variety of parameters from each model. In step 19, it is determined whether or not the performance objective of step 15 has been satisfied. As will be described in more detail herein, if the generation of the newly constructed offspring model does not satisfy the performance objective, another offspring model is constructed and step 17 is repeated. This iterative process continues until the performance objective is satisfied. Once the performance objective is satisfied, a result associated with the forecasting for a hydrocarbon producing reservoir can be produced, as shown in step 21. The result can be output from the system as a visual display representing a solution associated with the hydrocarbon producing reservoir forecast.

As an example, if the performance objective of step 15 is an optimization study, the result can include solving an objective function associated with the forecasting for a hydrocarbon producing reservoir. The objective function can maximize or minimize ultimate hydrocarbon recovery, net present value (NPV), reservoir percentage yield, reservoir fluid flow rate, history matching error, or a combination thereof. Iterations related to determining whether the performance objective is satisfied can continue in step 19 until the offspring model is generated a predetermined number of iterations or the offspring model converges to a predetermined variance. Decision parameters that represent the solution to the objective function can be output once the performance objective is satisfied. These decision parameters can be output from the system as a graphical display or in tabular format. Examples of such an output include, but are not limited to, a visual display of cumulative distribution functions, a visual display of multiple simulation results generated from a combination of decision parameters, a visual display of simulated parameters in time, or a combination thereof.

By way of another example, if the performance objective of step 15 is an uncertainty assessment, the forecast can be a result to an experimental design table. The result can be a sensitivity of one or more of permeability distributions porosity distributions, fluid contacts, fluid saturations, geobody connectivity, pore volume, fault transmissibility, sedimentological properties, reservoir fluid flow rates, reservoir pressure characteristics, reservoir temperature characteristics, upscaling properties, and training images. In this case, the performance objective can be considered satisfied once the offspring models have been generated a sufficient number of iterations to determine the sensitivity of the one or more parameters in the design table. These sensitivities can be output from the system once the performance objective is satisfied. These sensitivities can be output as a graphical display or in tabular format. For example, the output can be a visual display of multiple simulation results generated from a combination of sensitivities.

Figure 3:
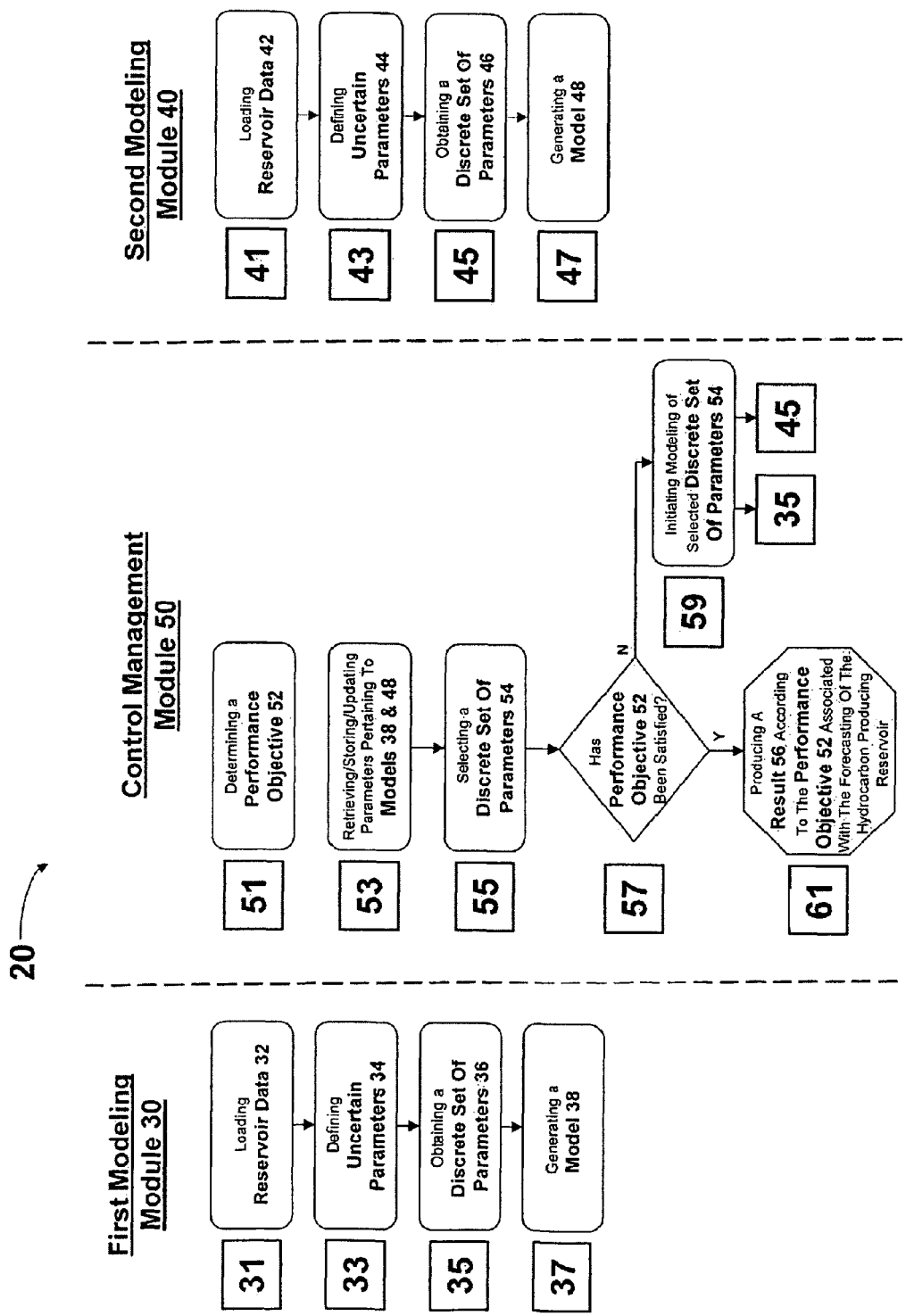
FIG. 3 is a schematic flow diagram illustrating steps used in a system having a first modeling module, second modeling module, and control management module, in accordance with the present invention.

FIG. 3 is a flowchart illustrating system 20 having an integrated modeling work-flow between a first modeling module 30, a second modeling module 40, and a control management module 50. First modeling module 30 and second modeling module 40 are used to generate models representing at least a portion of a hydrocarbon producing reservoir, such as subterranean reservoir 1. Control management module 50 is capable of controlling a plurality of operations for system 20.

In first modeling module 30, reservoir data 32 and defined parameters 34 can be used to obtain a discrete set of parameters 36 the discrete set of parameters 36 can be used to generate a model 38 that is representative of at least a portion of the hydrocarbon producing reservoir. As will be described more fully herein, first modeling module 30 can be a static or dynamic modeling module.

In second modeling module 40, reservoir data 42 and defined parameters 44 can be used to obtain a discrete set of parameters 46. The discrete set of parameters 46 can be used to generate a model 48 that is representative of at least a portion of the hydrocarbon producing reservoir. As will be described more fully herein, second modeling module 40 can be a static or dynamic modeling module.

A plurality of operations for system 20 are controlled by control management module 50. A performance objective 52 is determined and drives the desired forecasting outcome that is associated with the hydrocarbon production of the subterranean reservoir. Based on the performance objective 52, which is typically an optimization study or uncertainty assessment, the control management module 50 selects discrete sets of parameters 54. The discrete sets of parameters 54 are selected from stored parameters pertaining to models 38, 48 and can be used for generating offspring models until the performance objective 52 has been satisfied. Once the performance objective 52 has been satisfied, a result 56, in accordance with performance objective 52 and associated with the forecasting of hydrocarbon production from the subterranean reservoir, can be produced.

In operation of system 20, reservoir data 32 is loaded into first modeling module 30 and reservoir data 42 is loaded into second modeling module 40, respectively in steps 31 and 41. In each modeling module, uncertain parameters 34 and 44 are then defined respectively in steps 33 and 43. In certain embodiments, the user defines uncertain parameters 34 and 44. Uncertain parameters for first modeling module 30 and second modeling module 40 can include permeability distributions, porosity distributions, fluid contacts, fluid saturations, geobody connectivity, pore volume, fault transmissibility, sedimentological properties, reservoir fluid flow rates, reservoir pressure characteristics, reservoir temperature characteristics, upscaling properties, and training images. Reservoir data 32 and defined parameters 34 are then used in step 35 of first modeling module 30 to obtain a discrete set of parameters 36, which can then be used for generating model 38 in step 37. Similarly, in second modeling module 40, reservoir data 42 and defined parameters 44 are used in step 45 to obtain a discrete set of parameters 46, which can then be used for generating model 48 in step 47.

The workflow of control management module 50 begins with determining a performance objective 52, as shown in step 51. During operation of system 20, the performance objective 52 drives the desired forecasting outcome and typically is either an optimization study or uncertainty assessment. The performance objective can be manually selected by an operator and in other instances the performance objective can be predefined by system 20. Once the performance objective 52 has been determined, control management module 50 retrieves and stores parameters pertaining to model 38 from the first modeling module 30 and parameters pertaining to model 48 from the second modeling module 40 in step 53. In step 55, a discrete set of parameters 54 is selected from the parameters previously stored in step 53. If the performance objective 52 has not been satisfied at step 57, the control management module 50 initiates modeling of the discrete set of parameters 54 in step 59. If the control management module 50 initiates modeling with the first modeling module 30, the discrete set of parameters 54 can be used as the discrete set of parameters 36 in step 35 for generation of an offspring model 38. Similarly, if the control management module 50 initiates modeling with the second modeling module 40, the discrete set of parameters 54 can be used as the discrete set of parameters 46 in step 45 for generation of an offspring model 48. The control management module 50 then updates or replaces the previously stored parameter sets in step 53 with the parameters characterizing the newly generated offspring models 38, 48. It will be appreciated by one skilled in the art that both first modeling module 30 and second modeling module 40 can be operated concurrently. Refinement of the parameter set continues until the performance objective 52 has been satisfied in step 57, at which point a result 56 associated with forecasting for the hydrocarbon producing reservoir can be produced in step 61.

Figure 4:
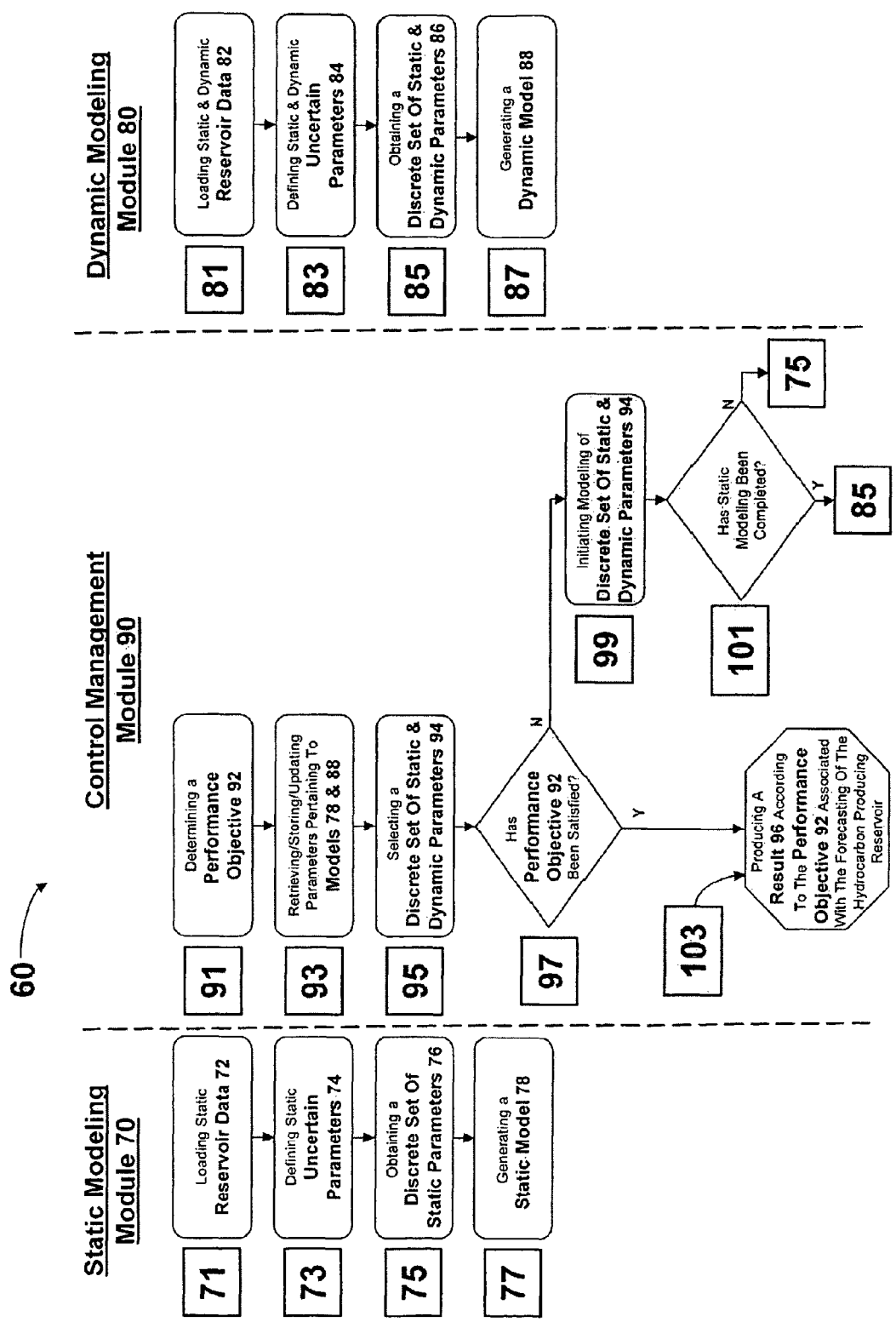
FIG. 4 is a schematic flow diagram illustrating steps used in a system having a static modeling module, dynamic modeling module, and control management module, in accordance with the present invention.

FIG. 4 illustrates system 60, which is a variation of system 20 shown in. FIG. 3, where first modeling module. 30 is now represented by static modeling module 70, second modeling module 40 is now represented by dynamic modeling module 80, and control management module 50 in now represented by control management module 90.

Static modeling module 70 performs static modeling of a reservoir using reservoir data 72. The static model incorporates seismic data to build a rough structural and stratigraphic framework. This framework is then populated with parameters such as sedimentological properties, permeability and porosity distributions, fluid contacts, and fluid saturations. A plurality of model outcomes may be calculated based on the populated framework, as each assigned parameter or parameter range attributes a certain amount of indefiniteness or inherent uncertainty. Items such as poor seismic images or areas below the threshold of seismic resolution may increase this uncertainty. For instance, it may be difficult to distinguish whether a particular geobody is comprised of sand or shale from acoustic impedance alone and a best guess range may be inputted into the static model. These static uncertain parameters 74 can be defined and used with reservoir data 72 to obtain a discrete set of static parameters 76, which can be used for generating static model 78. One skilled in the art will appreciate that the workflow of static modeling module 70 can be scriptable to allow for automatic generation of static models. In this scenario, the individual steps of generating a static model are manually performed and recorded into a script. Uncertain static parameters 74 can then be input into the script and the static modeling module 70 is capable of automatically generating a static model.

Dynamic modeling module 80 begins construction of a dynamic model of a reservoir by upscaling a static model, such as static model 78, as the fine scale properties of a static model tend to exceed current computational capabilities when paired with flow simulation. A range of local and global techniques have been developed to ensure that the upscaled approximations serve as a robust interpretation of the static geological model complexities. Spatial resolution is applied to the coarser model, such that the model is layered with thousands or even millions of individual cells defining a grid. Accordingly, the model can be analyzed using various algorithms to determine potential interactions or connectivity between the individual cells. Certain grids may be unstructured or structured depending on whether the model should be constrained to preserve certain stratigraphic or sedimentological characteristics. The upscaled model is populated with uncertain static and dynamic parameter data such as sedimentological properties, permeability and porosity distributions, fluid contacts, fluid saturations, reservoir fluid flow rates and PVT characteristics. Similar to the parameters used in static modeling, each assigned parameter or parameter range attributes a certain amount of indefiniteness or uncertainty. Once these static and dynamic uncertain parameters 84 are defined, they can be used with static and dynamic reservoir data 82 to obtain a discrete set of static and dynamic parameters 86, which can then be used for generating dynamic model 88.

A plurality of operations for system 60 are controlled by control management module 90. Similar to system 20, a performance objective 92 is determined and drives the desired forecasting outcome. Based on the performance objective 92, the control management module 90 selects discrete sets of static and dynamic parameters 94. The discrete sets of static and dynamic parameters 94 are selected from stored parameters pertaining to models 78, 88 and can be used for generating static and dynamic offspring models until the performance objective 92 has been satisfied. Once the performance objective 92 has been satisfied, a result 96 associated with the forecasting of hydrocarbon production from the subterranean reservoir, which is in accordance with the performance objective 92, can be produced.

In operation of system 60, static reservoir data 72 is loaded into static modeling module 70 and static and dynamic reservoir data 82 is loaded into dynamic modeling module 80, respectively in steps 71 and 81. In each modeling module, uncertain parameters 74 and 84 are then defined respectively in steps 73 and 83. In certain embodiments, the user defines uncertain parameters 74 and 84. In other embodiments, system 60 call attribute predefined ranges to uncertain parameters 74 and 84. Uncertain parameters for static modeling module 70 can include permeability distribution, porosity distributions, fluid contacts, fluid saturations, geobody connectivity, pore volume, fault transmissibility, and sedimentological properties. In addition to these static uncertain parameters, dynamic modeling module 80 can also include dynamic uncertain parameters including uncertainty in reservoir fluid flow rates, reservoir pressure characteristics, reservoir temperature characteristics, upscaling properties and training images. Static reservoir data 72 and defined uncertain parameters 74 are used in step 75 of static modeling module 70 to obtain a discrete set of static parameters 76, which can then be used for generating static model 78 in step 77. Similarly, in dynamic modeling module 80, static and dynamic reservoir data 82 and defined uncertain static and dynamic parameters 84 are used in step 85 to obtain a discrete set of static and dynamic parameters 86, which can then be used for generating dynamic model 88 in step 87.

The workflow of control management module 90 begins with determining a performance objective 92, as shown in step 91. During operation of system 60, the performance objective 92 drives the desired forecasting outcome and typically is either an optimization study or uncertainty assessment. The performance objective 92 can be manually selected by an operator or the performance objective 92 can be predefined by system 60. Once the performance objective 92 has been determined, control management module 90 retrieves and stores parameters pertaining to static model 78 from static modeling module 70 and parameters pertaining to dynamic model 88 from dynamic modeling module 80, as shown in step 93. In step 95, a discrete set of static and dynamic parameters 94 is selected from the parameters previously stored in step 93. If the performance objective 92 has not been satisfied at step 97, the control management module 90 initiates modeling of the discrete set of static and dynamic parameters 94 in step 99. In step 101, it is determined whether static modeling for the discrete set of static and dynamic parameters 94 has been completed. If static modeling has not been completed, the control management module 90 initiates modeling with the static modeling module 70 such that the static parameters from the discrete set of static and dynamic parameters 94 can be used as the discrete set of static parameters 76 in step 75 for generation of a static offspring model 78. If static modeling has been completed, the control management module 90 initiates modeling with the dynamic modeling module 80. In this scenario, the discrete set of static and dynamic parameters 94 can be used as the discrete set of static and dynamic parameters 86 in step 85 for generation of a dynamic offspring model 88. Once a static or dynamic offspring model has been generated, the control management module 90 updates or replaces the previously stored parameter sets in step 93 with the parameters characterizing the newly generated static or dynamic offspring models, 78 or 88, respectively. It will be appreciated by one skilled in the art, that both static modeling module 70 and dynamic modeling module 80 can be operated concurrently. Iterative refinement of the parameter set stored in step 93 continues until the performance objective 92 is satisfied in step 97. Once the performance objective 92 is satisfied, a result 96 associated with forecasting for the hydrocarbon producing reservoir is produced in step 103.

Figure 5:
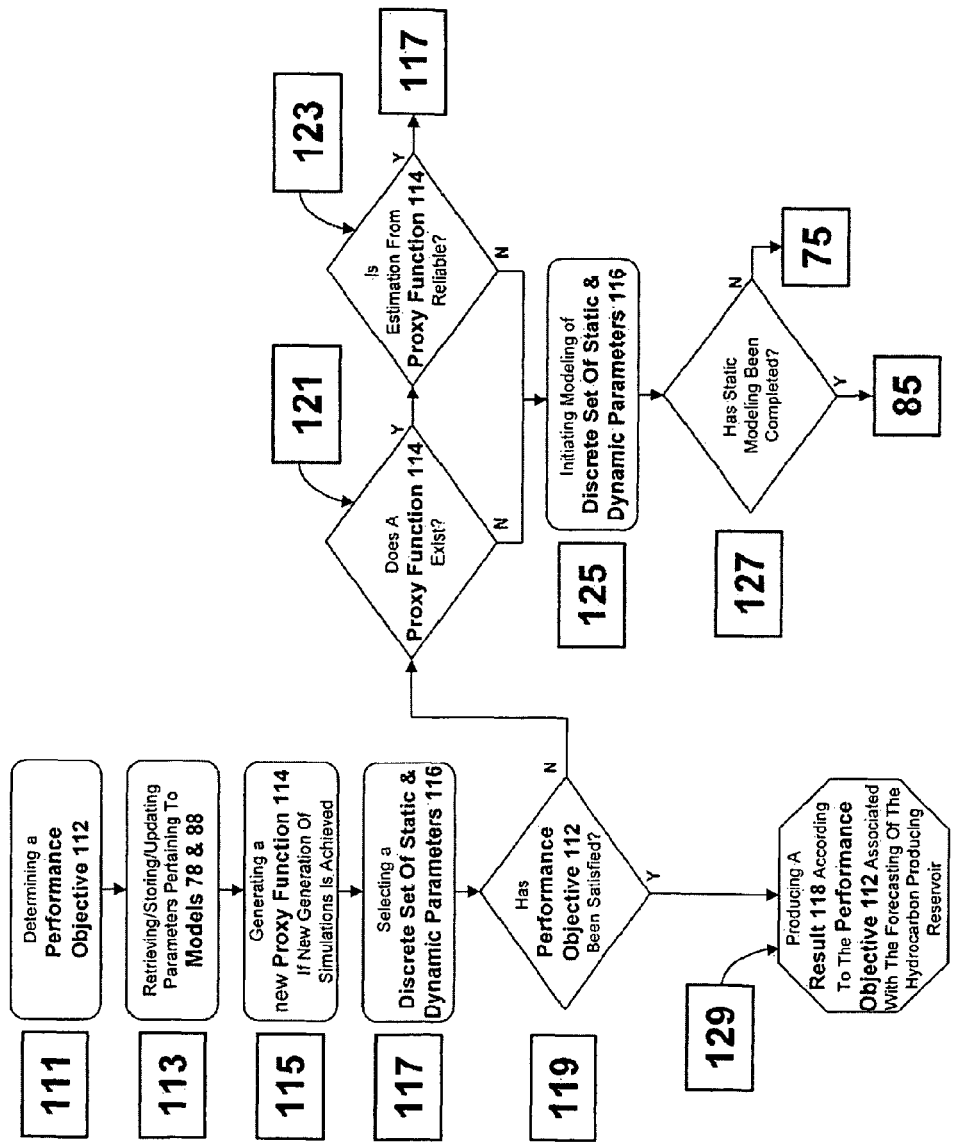
FIG. 5 is a schematic flow diagram illustrating a control management module utilizing proxies, in accordance with the present invention.

As shown in FIG. 5, control management module 110 can alternatively be used in system 60 in place of control management module 90. Similar to control management module 90, a performance objective 112 is determined that drives the desired forecasting outcome. Based on the performance objective 112 and the parameters pertaining to models 78 and 88, control management module 110 can generate one or more proxy functions 114.

Control management module 10 can utilize proxy functions 114 to filter the selection of offspring models. Proxy functions 114 can also be utilized as an inexpensive and reliable surrogate to numerical simulation. Depending on the performance objective 112, the quantity and type of proxy functions 114 created can vary. For example, if the performance objective is an uncertainty assessment, a Kriging proxy, a neural network proxy, a splines proxy, and/or a polynomial proxy may be utilized. One skilled in the art will appreciate that numerous proxies can theoretically be created, assuming enough data is available, as one can always increase to a higher order polynomial proxy; however, typically applying up to a second order polynomial with cross-terms (i.e., a linear polynomial, a quadratic polynomial, and a quadratic polynomial with cross terms) is sufficient. If the performance objective is an optimization study, a Kriging proxy, a neural network proxy, and/or a splines proxy can be used.

After formulation of proxy functions 114, control management module 110 selects discrete sets of static and dynamic parameters 116. The discrete sets of static and dynamic parameters 116 can be used for iteratively generating static and dynamic offspring models until the performance objective 112 is satisfied. A result 118 associated with the forecasting of hydrocarbon production from the subterranean reservoir, which is in accordance with the performance objective 112, is then produced.

In operation, the workflow of control management module 110 begins with determining a performance objective 112, as shown in step 111. During operation of system 60, the performance objective 112 drives the desired forecasting outcome and typically is either an optimization study or uncertainty assessment. The performance objective 112 can be manually selected by an operator and in other instances the performance objective 112 can be predefined by system 60. Once the performance objective 112 has been determined, control management module 110 retrieves and stores parameters pertaining to static model 78 from static modeling module 70 and parameters pertaining to dynamic model 88 from dynamic modeling module 80 in step 113. In step 115, one or more proxy functions 114 are generated based on the performance objective 112 and parameters pertaining to models 78 and 88. A discrete set of static and dynamic parameters 116 is selected in step 117 from the static and dynamic parameters previously stored in step 113.

If the performance objective 112 has not been satisfied at step 119, the control management module 110 determines in step 121 whether one or more proxy functions 114 have already been formulated. If proxy functions 114 do exist, it is determined in step 123 whether the estimation provided by the one or more proxy functions 114 is reliable for the likely outcome of modeling the discrete set of static and dynamic parameters 116. If the proxy estimation is reliable, a new discrete set of static and dynamic parameters 116 is selected in step 117. If proxy functions 114 do not exist in step 121 or if the proxy estimation is not reliable in step 123, the control management module 110 initiates modeling of the discrete set of static and dynamic parameters 116 in step 125.

In step 127, it is determined whether static modeling for the discrete set of static and dynamic parameters 116 has been completed. If static modeling has not been completed, the control management module 110 initiates modeling with the static modeling module 70 such that the static parameters from the discrete set of static and dynamic parameters 116 can be used as the discrete set of static parameters 76 in step 75 for generation of a static offspring model 78. If static modeling has been completed, the control management module 110 initiates modeling with the dynamic modeling module 80. In this scenario, the discrete set of static and dynamic parameters 116 can be used as the discrete set of static and dynamic parameters 86 in step 85 for generation of a dynamic offspring model 88.

Once a static or dynamic offspring model has been generated, the control management module 110 updates or replaces the previously stored parameter sets in step 113 with the parameters characterizing the newly generated static or dynamic offspring models, 78 or 88, respectively. If the new set of parameters characterizing the newly generated static or dynamic offspring models form a new generation of model simulations, new proxy functions 114 can be generated. A new generation of model simulations is determined by the use of genetic algorithms, which are well known by those skilled in the art. Genetic algorithms sample the parameter set and determine the average population fitness, or in other words, the arithmetic average of the objective function retrieved after each simulation run. If the fitness level between simulations runs improves by a predetermined threshold, a new generation of simulations is considered to occur.

Iterative refinement of the discrete set of static and dynamic parameters 116 stored in step 113 continues until the performance objective 112 is satisfied in step 119. Once the performance objective 112 is satisfied, a result 118 associated with forecasting for the hydrocarbon producing reservoir is produced in step 129.

Figure 6:
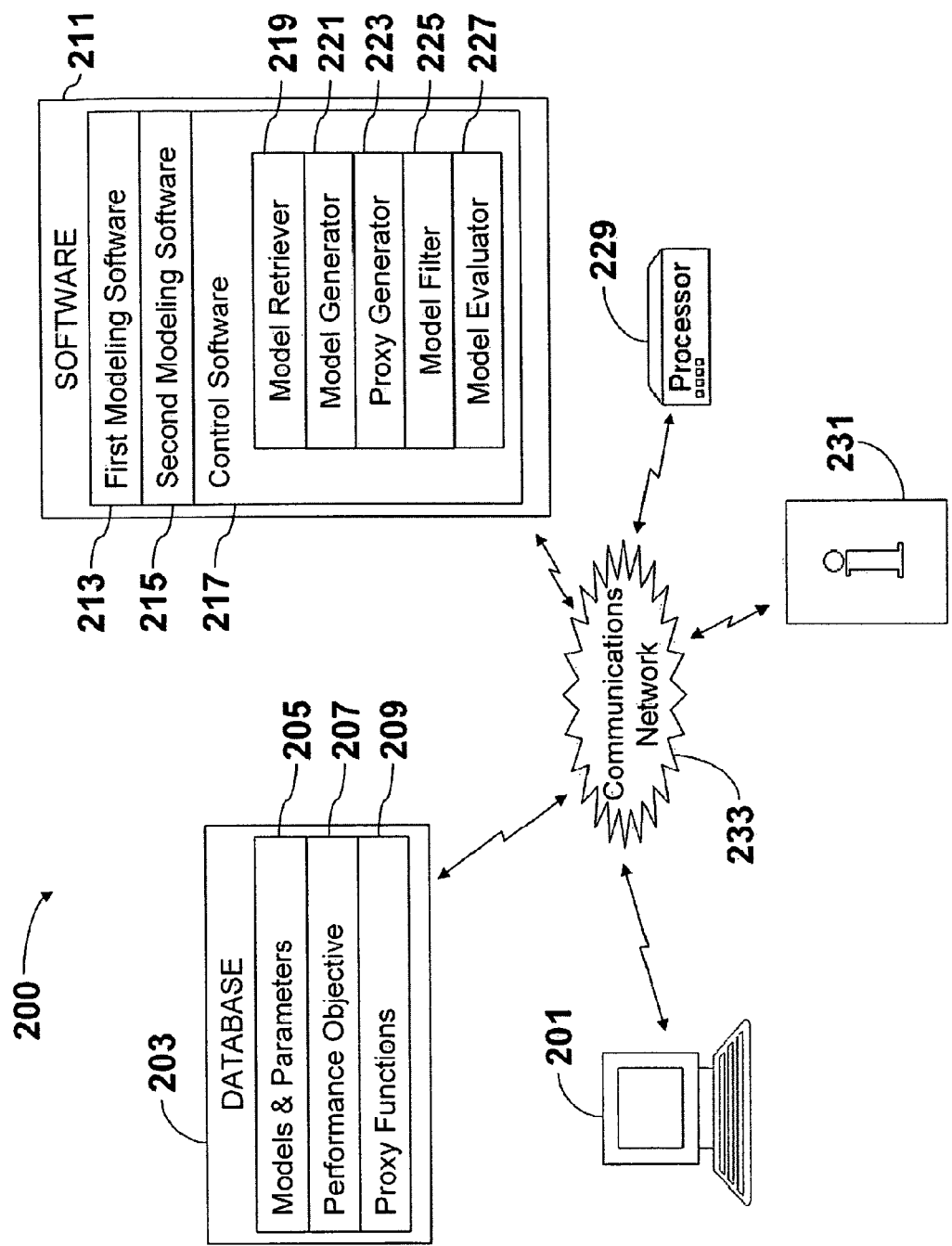
FIG. 6 is a schematic diagram of a system for forecasting hydrocarbon production of a reservoir, in accordance with the present invention.

FIG. 6 illustrates a system 200 by which hydrocarbon production forecasts for a reservoir are made according to an embodiment of the present invention. System. 200 includes user interface 201, such that an operator can actively input information and review operations of system 200. User interface 201 can be any means in which a person is capable of interacting with system 200 such as a keyboard, mouse, or touch-screen display. Input that is entered into system 200 through user interface 201 can be stored in a database 203. Additionally, any information generated by system 200 can also be stored in database 203. For example, database 203 can store user-defined parameters, as well as, system generated offspring models. Accordingly, models and parameters 205, performance objectives 207, and proxy functions 209 are all examples of information that can be stored in database 203.

System 200 includes software 211 that is stored on a processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. Software 211 includes first modeling software 213 capable of generating a model representative of a reservoir, such as subterranean reservoir 1. Software 211 includes second modeling software 215 capable of generating a model representative of a reservoir, such as subterranean reservoir 1. First and second modeling software, 213 and 215 respectively, can be either static or dynamic modeling software. Software 211 also includes control software 217. As will be described more fully herein, control software 217 includes a plurality of modules including a model retriever 219, a model generator 221, a proxy generator 223, a model filter 225, and a model evaluator 227. Processor 229 interprets instructions to execute software 211, as well as, generates automatic instructions to execute software for system 200 responsive to predetermined conditions. Instructions from both user interface 201 and control software 217 are processed by processor 229 for operation of system 200. In some embodiments, a plurality of processors can be utilized such that system operations can be executed more rapidly.

In certain embodiments, system 200 can include reporting unit 231 to provide information to the operator or to other systems (not shown). For example, reporting unit 231 can be a printer, display screen, or a data storage device. However, it should be understood that system 200 need not include reporting unit 231, and alternatively user interface 201 can be utilized for reporting information of system 200 to the operator.

Communication between any components of system 200, such as user interface 201, database 203, software 211, processor 229 and reporting unit 231, can be transferred over a communications network 233. Communications network 233 can be any means that allows for information transfer. Examples of such a communications network 233 presently include, but are not limited to, a switch within a computer, a personal area network (PAN), a local area network (LAN), a wide area network (WAN), and a global area network (GAN). Communications network 233 can also include any hardware technology used to connect the individual devices in the network, such as an optical cable or wireless radio frequency.

In operation, an operator inputs data, such as undefined parameters, through user interface 201 into database 203 and then initiates first and second modeling software, 213 and 215, respectively, to generate models representative of a subterranean reservoir. Constructed models, comprised of a plurality of parameters embodying characteristics of the reservoir, are stored as models and parameters 205 in database 203. Once the performance objective 207 has been defined for system 200, either by the operator through user interface 201 or by the control software 217, the control software 217 can initiate iterative refinement of the reservoir models using first modeling software 213 and second modeling software 215.

Iterative refinement of the reservoir models begins with the model retriever 219 of control software 217 retrieving models and parameters 205 stored in the database 203. Model generator 221 can generate numerous offspring models responsive to models and parameters 205. Model generator 221 controls the type of software used to generate each offspring model, i.e., first modeling software 213 and second modeling software 215. As models are generated, proxy generator 223 can generate proxy functions responsive to the models. Typical types of proxy functions that are generated by proxy generator 223 include kriging proxies, neural network proxies, splines proxies, and polynomial proxies. Formulated proxy functions 209 are stored in database 203 for each generation of simulated models. Proxy functions 209 can be used to overcome the computational infeasibility of simulating detailed geological models. For instance, one can tune proxy functions 209 through uncertainty assessments and utilize them as inexpensive and reliable surrogates to forecast the production from a reservoir. In other instances, such as performing an optimization study, proxy functions 209 can be used by model filter 225 to prohibit model generator 221 from generating particular offspring models. Offspring models that are generated by first modeling software 213 or second modeling software 215 are evaluated by model evaluator 227 to determine whether the offspring model satisfies the stored performance objective 207. If the offspring model does not satisfy the performance objective 207, iterative refinement of the reservoir models continues. If the offspring model satisfies the performance objective 207, a forecast can be generated for the hydrocarbon producing reservoir. The forecast can be output to the operator with reporting unit 231 or can be provided through user interface 201.

Figure 7:
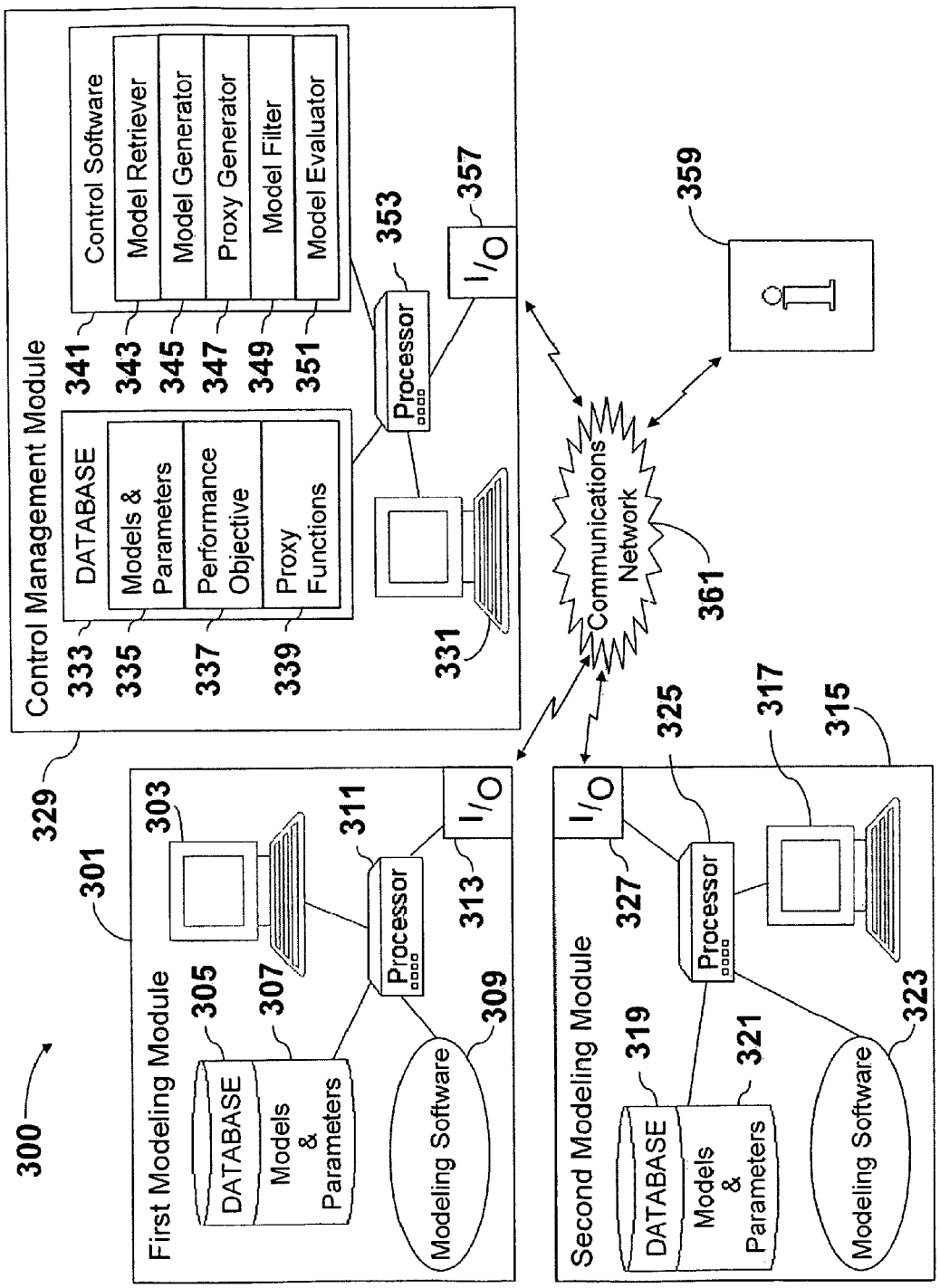
FIG. 7 is a schematic diagram of a system for forecasting hydrocarbon production of a reservoir, in accordance with the present invention.

FIG. 7 illustrates process or system 300, similar to process or system 200 shown in FIG. 6, where the system architecture includes three distinct modules.

First modeling module 301 is used to generate models representative of a reservoir, such as subterranean reservoir 1. First modeling module 301 includes a user interface 303 in which the operator can enter data, review ongoing operations, or control operation of first modeling module 301. User interface 303 can be any means in which a person is capable of interacting with first modeling module 301 such as a keyboard, mouse, or touch-screen display. Input that is entered through user interface 303 can be stored in database 305. For example, models and parameters 307 can include uploaded reservoir data and user defined parameters. Modeling software 309 cab use information stored in database 305 to generate models representative of the reservoir. Models and parameters 307 can also include models generated by modeling software 309. During operation of first modeling module 301, processor 311 processes instructions to execute modeling software 309. As will be described more fully herein, instructions from both user interface 303 and from other modules, can be processed by processor 311 for operation of first modeling module 301. Processor 311 can process information that is transferred to and from first modeling module 301 through input/output device 313. One skilled in the art will appreciate that, if desired, a plurality of processors in communication with first modeling module 301 can be employed to reduce the computational time needed to generate a model.

Similar to first modeling module 301, second modeling module 315 is used to generate models representative of a reservoir, such as subterranean reservoir 1. Second modeling module 315 includes a user interface 317 in which the operator can enter data, review ongoing operations, or control operation of second modeling module 315. User interface 317 can be any means in which a person is capable of interacting with second modeling module 315 such as a keyboard, mouse, or touch-screen display. Input that is entered through user interface 317 can be stored in database 319. For example, models and parameters 321 can include uploaded reservoir data and user defined parameters. Modeling software 323 can use information stored in database 319 to generate models representative of the reservoir. Models and parameters 321 can also include models generated by modeling software 323. During operation of second modeling module 315, processor 325 processes instructions to execute modeling software 323. As will be described more fully herein, instructions from both user interface 317 and from other modules, can be processed by processor 325 for operation of second modeling module 315. Processor 325 can process information that is transferred to and from second modeling module 315 through input/output device 327. One skilled in the art will appreciate that, if desired, a plurality of processors in communication with second modeling module 315 can be employed to reduce the computational time needed to generate a model.

Control management module 329 is used to control operation of system 300. Control management module 329 includes a user interface 331 to input information and review operations of system 300, including operations of control management module 329. User interface 331 can be any means in which a person is capable of interacting with control management module 329 such as a keyboard, mouse, or touch-screen display. Input that is entered through user interface 331 can be stored in database 333. For example, models and parameters 335 can include uploaded reservoir data and user defined parameters. Additionally, in some embodiments the operator can input a performance objective 337. Control management module 329 also includes control software 341. As will be described more fully herein, control software 341 includes a plurality of modules including a model retriever 343, model generator 345, proxy generator 347, model filter 349, and a model evaluator 351. During operation of control management module 329, processor 353 processes instructions to execute control software 341. Processor 353 can process information that is transferred to and from control management module 329 through input/output device 357. One skilled in the art will appreciate that, if desired, a plurality of processors in communication with control management module 329 can be employed.

In certain embodiments, system 300 can include reporting unit 359 to provide information to the operator. For example, reporting unit 359 can be a printer, display screen, or a data storage device. However, it should be understood that system 300 need not include reporting unit 359, and alternatively any one of user interfaces 303, 317, 331 can be utilized for reporting of information in system 300 to the operator.

Communication between any components of system 300, such as first modeling module 301, second modeling module 315, control management module 329 and reporting unit 359, can be transferred over communications network 361. First modeling module 301 is connected to communications network 361 through input/output device 313, second modeling module 315 is connected to communications network 361 through input/output device 327, and control management module 329 is connected to communications network 361 through input/output device 357. Communications network 361 can be any means that allows for information transfer. Examples of such a communications network 361 presently include, but are not limited to, a personal area network (PAN), a local area network (LAN), a wide area network (WAN), and a global area network (GAN). Communications network 361 can also include any hardware technology used to connect the individual devices in the network, such as an optical cable or wireless radio frequency.

In operation of system 300, first and second models representing a reservoir are generated using first modeling module 301 and second modeling module 315. First and second models, typically comprised of a plurality of parameters embodying characteristics of the reservoir, can he stored respectively in databases 305, 319. One skilled in the art will appreciate that first modeling module 301 and second modeling module 315 can be operated concurrently. The performance objective 337, which can be defined either by the operator or by the control software 341, dictates the operation of system 300.

Operation of system 340 typically includes iterative refinement of the reservoir models. Iterative refinement of the reservoir models begins with the model retriever 343 of control software 341 retrieving models and parameters stored in databases 305, 319 of first and second modeling modules 301 and 315, respectively. Data received from the first and second modeling models can be stored in database 333 and used by model generator 345 to generate offspring models using first modeling software 301 and second modeling software 315. As offspring models are generated, proxy generator 347 can generate proxy functions 339 responsive to the models. Typical types of proxy functions that are generated by proxy generator 339 include kriging proxies, neural network proxies, splines proxies, and polynomial proxies. Formulated proxy functions 339 are stored in database 333 for each generation of simulated models. Proxy functions 339 can be used by model filter 349 to prohibit model generator 345 from generating offspring models if an estimate from the proxy functions 339 is reliable. Additionally, proxy functions 339 can be used in subsequent operations to replace numerical simulators. Offspring models that are generated by first modeling module 301 or second modeling module 315 are evaluated by model evaluator 351 to determine whether the offspring model satisfies the stored performance objective 337. If the offspring model does not satisfies the performance objective 337, iterative refinement of the reservoir models continues. If the offspring model satisfies the performance objective 337, a forecast can be generated for the hydrocarbon producing reservoir. The forecast can be outputted to the operator with reporting unit 359 or can be reported through any one of user interfaces 303, 317, or 331.

The above systems and methods integrate the workflows of computational modeling to efficiently forecast hydrocarbon production characteristics from subterranean reservoirs. The workflows eliminate error due to inaccurate assessment and poor knowledge capture during transfer of data across the multiple disciplines needed. They streamline the process of production data model refinement and history matching optimization. Therefore, the present invention enables more efficient forecasting of hydrocarbon production, while mitigating model uncertainty. While this invention has been described in relation to certain preferred embodiments, and many details have been set forth for the purpose of illustration, it will be apparent to those skilled in the art that the invention is susceptible to alteration and that certain other details described herein can vary considerably without departing from the basic principles of the invention.

What is claimed is:

1. A computer-implemented method to automate forecasting of a hydrocarbon producing reservoir, the method comprising:
    (a) providing a performance objective associated with forecasting of a hydrocarbon producing reservoir via a user interface in communication with a reservoir modeling program, wherein the performance objective is an uncertainty assessment, and the uncertainty assessment comprises an experimental design table including a parameter selected from the group consisting of permeability distributions, porosity distributions, fluid contacts, fluid saturations, geobody connectivity, pore volume, fault transmissibility, sedimentological properties, reservoir fluid flow rates, reservoir pressure characteristics, reservoir temperature characteristics, upscaling properties, and training images;
    (b) automatically generating a gridded static model representative of at least a portion of the hydrocarbon producing reservoir via a static modeling module of the reservoir modeling program using static reservoir data and a discrete set of static parameters;
    (c) automatically generating a dynamic model representative of at least a portion of the hydrocarbon producing reservoir via a dynamic modeling module of the reservoir modeling program using the static model and a discrete set of dynamic parameters;
    (d) evaluating the dynamic model against the performance objective via a control management module of the reservoir modeling program;
    (e) until the performance objective is satisfied, iteratively combining the static and dynamic models, via the control management module of the reservoir modeling program, to automatically generate an offspring model per iteration, wherein combining the static and dynamic models includes regenerating at least one of the dynamic model or the static model during each iteration; and
    (f) outputting a result according to the performance objective associated with the forecasting of the hydrocarbon producing reservoir subsequent to completion of step (e).

2. The method of claim 1, wherein both the static and dynamic modeling modules can operate concurrently.

3. The method of claim 1, wherein step (f) is performed via the control management module.

4. The method of claim 1, wherein:
    step (e) further comprises generating a proxy function responsive to the offspring model.

5. The method of claim 1,
    further comprising performing an optimization study;
    the result according to the optimization study comprises an objective function associated with the hydrocarbon producing reservoir; and
    the objective function includes at least one of maximizing and minimizing an item selected from the group consisting of ultimate hydrocarbon recovery, net present value, reservoir percentage yield, reservoir fluid flow rate, and history matching error.

6. The method of claim 5, wherein the optimization study is satisfied once one of the following steps occur selected from the group consisting of the offspring model has been generated a predetermined number of iterations, and the offspring model converges to a predetermined variance.

7. The method of claim 1, wherein step (e) of claim 1 further comprises generating the offspring model responsive to a previously generated offspring model.

8. The method of claim 1, wherein:
    the result according to the uncertainty assessment is a sensitivity of the parameter; and
    the performance objective is satisfied once the sensitivity of the parameter has been determined.

9. The method of claim 1, wherein the dynamic model defines a structured or unstructured grid automatically generated from the static model at a coarse resolution for reservoir simulation.

10. A computer-implemented method to automate forecasting of a hydrocarbon producing reservoir, the method comprising:
    (a) modeling a gridded static model representative of at least a portion of a hydrocarbon producing reservoir with a static modeling module, wherein the gridded static model is automatically generated using static reservoir data and a discrete set of static parameters;
    (b) modeling a dynamic model representative of at least a portion of the hydrocarbon producing reservoir with a dynamic modeling module, wherein the dynamic model is automatically generated using the static model and a discrete set of dynamic parameters;
    (c) generating a discrete set of parameters responsive to the static model and the dynamic model with a control management module, wherein the discrete set of parameters is selected from the group consisting of permeability distributions porosity distributions, fluid contacts, fluid saturations, geobody connectivity, pore volume, fault transmissibility, sedimentological properties, reservoir fluid flow rates, reservoir pressure characteristics, reservoir temperature characteristics, upscaling properties, and training images;
    (d) modeling an offspring model responsive to at least one parameter from the discrete set of parameters, the modeling of the offspring model is performed with at least one of the static and dynamic modeling modules, and wherein the modeling of the offspring model includes combining the static and dynamic models to automatically generate the offspring model;
    (e) updating the discrete set of parameters responsive to the offspring model with the control management module;
    (f) repeating steps (d) and (e), including regenerating at least one of the dynamic model or the static model during each iteration, until one of the following occurs selected from the group consisting of the offspring model has been generated a predetermined number of iterations, the offspring model converges to a predetermined variance, and a sensitivity of the at least one parameter has been determined; and (g) outputting a visual display of a solution associated with forecasting of the hydrocarbon producing reservoir subsequent to completion of step (f), wherein the visual display of the solution comprises a result to an uncertainty assessment.

11. The method of claim 10, wherein the offspring model is a static model when the modeling of the offspring model is generated with the static modeling module and the offspring model is a dynamic model when the modeling of the offspring model is generated with the dynamic modeling module.

12. The method of claim 10, wherein the visual display of the solution comprises a result of an optimization study.

13. A system to automate forecasting of a hydrocarbon producing reservoir, the system comprising:
a computer processor;
a computer program executable on the computer processor, the computer program comprising:
a first modeling module to automatically generate a first model representative of at least a portion of the hydrocarbon producing reservoir using first reservoir data and a first discrete set of parameters, wherein the first modeling module is a static modeling model and the first model is a static model;
a second modeling module to generate a second model representative of at least a portion of the hydrocarbon producing reservoir using the first model and a second discrete set of parameters, wherein the second modeling module is a dynamic modeling model and the second model is a dynamic model; and
a control management module to evaluate the second model against a performance objective associated with the forecasting of the system, and until the performance objective is satisfied, to automatically generate offspring models responsive to the first and second models with at least one of the first modeling module and the second modeling module, wherein generating the offspring models includes regenerating at least one of the second model or the first model, and wherein the control management module outputs a result according to the performance objective subsequent to the performance objective being satisfied,
wherein the performance objective is an uncertainty assessment, and the uncertainty assessment comprises an experimental design table including a parameter selected from the group consisting of permeability distributions, porosity distributions, fluid contacts, fluid saturations, geobody connectivity, pore volume, fault transmissibility, sedimentological properties, reservoir fluid flow rates, reservoir pressure characteristics, reservoir temperature characteristics, upscaling properties, and training images.

14. The system of claim 13, further comprising an optimization study; the result to the optimization study comprising an objective function associated with the hydrocarbon producing reservoir; the objective function includes at least one of maximizing and minimizing an item selected from the group consisting of ultimate hydrocarbon recovery, net present value, reservoir percentage yield, reservoir fluid flow rate, and history matching error; and the optimization study is satisfied once one of the following occurs selected from the group consisting of the offspring model has been generated a predetermined number of iterations, and the offspring model converges to a predetermined variance.

15. The system of claim 13, wherein the result to the uncertainty assessment is a sensitivity of the parameter; and the performance objective is satisfied once the sensitivity of the parameter has been determined.

16. A system to automate forecasting of a hydrocarbon producing reservoir, the system comprising:
a computer processor;
a software program executable on the computer processor, the software program comprising:
(a) a first modeling module to automatically generate a first model representative of at least a portion of the hydrocarbon producing reservoir using first reservoir data and a first discrete set of parameters, wherein the first modeling module is a static modeling module and the first model is a static model;
(b) a second modeling module to automatically generate a second model representative of at least a portion of the hydrocarbon producing reservoir using the first model and a second discrete set of parameters, wherein the second modeling module is a dynamic modeling module and the second model is a dynamic model; and
(c) a control management module that initiates a plurality of operations for the software program responsive to a performance objective, the control management module including at least one of a model retriever to retrieve the first and second models over a communications network, a model generator to automatically generate offspring models responsive to the first and second models with the first and second modeling modules, wherein generating the offspring models includes regenerating at least one of the second model or the first model, a proxy generator to generate a proxy function responsive to the first and second models, a model filter that prohibits the model generator from generating the offspring models responsive to the proxy function, and a model evaluator to evaluate the offspring models and generate a forecast for the hydrocarbon producing reservoir,
(d) wherein the performance objective is an uncertainty assessment, and the uncertainty assessment comprises an experimental design table including a parameter selected from the group consisting of permeability distributions, porosity distributions, fluid contacts, fluid saturations, geobody connectivity, pore volume, fault transmissibility, sedimentological properties, reservoir fluid flow rates, reservoir pressure characteristics, reservoir temperature characteristics, upscaling properties, and training images;
a user control interface for inputting information into the system, the information including the performance objective;
a database to store the performance objective, first and second models, and offspring models; and
a user reporting means in communication with the control management module over the communications network to output the forecast for the hydrocarbon producing reservoir.

17. The system of claim 16, further comprising performing an optimization study; the optimization study comprising an objective function associated with the hydrocarbon producing reservoir; the objective function includes at least one of maximizing and minimizing an item selected from the group consisting of ultimate hydrocarbon recovery, net present value, reservoir percentage yield, reservoir fluid flow rate, and history matching error.

18. A non-transitory processor readable medium containing computer readable software instructions used to automate forecasting of a hydrocarbon producing reservoir, the software comprising:
- (a) a first modeling module to automatically generate a first model representative of at least a portion of the hydrocarbon producing reservoir using first reservoir data and a first discrete set of parameters, wherein the first modeling module is a static modeling module and the first model is a static model;
- (b) a second modeling module to automatically generate a second model representative of at least a portion of the hydrocarbon producing reservoir using the first model and a second discrete set of parameters, wherein the second modeling module is a dynamic modeling module and the second model is a dynamic model; and
- (c) a control management module that initiates a plurality of operations for the software program responsive to a performance objective, the control management module including at least one of a model retriever to retrieve the first and second models over a communications network, a model generator to automatically generate offspring models responsive to the first and second models with the first and second modeling modules, wherein generating the offspring models includes regenerating at least one of the second model or the first model, a proxy generator to generate a proxy function responsive to the first and second models, a model filter that prohibits the model generator from generating the offspring models responsive to the proxy function, and a model evaluator to evaluate the offspring models and generate a forecast for the hydrocarbon producing reservoir,
- (d) wherein the performance objective is an uncertainty assessment, and the uncertainty assessment comprises an experimental design table including a parameter selected from the group consisting of permeability distributions, porosity distributions, fluid contacts, fluid saturations, geobody connectivity, pore volume, fault transmissibility, sedimentological properties, reservoir fluid flow rates, reservoir pressure characteristics, reservoir temperature characteristics, upscaling properties, and training images.

19. The non-transitory processor readable medium of claim 18, wherein the proxy function is selected from the group consisting of kriging, neural network, splines, and polynomial proxy functions.

* * * * *